United States Patent
Juul et al.

US 6,655,492 B2

(10) Patent No.: US 6,655,492 B2
(45) Date of Patent: Dec. 2, 2003

(54) STEERING SYSTEM AND METHOD FOR STEERING A VEHICLE

(75) Inventors: Torben Juul, Sonderborg (DK); Tom Rudolph, Ames, IA (US)

(73) Assignee: Sauer-Danfoss Holding A/S (DK)

( * ) Notice: Subject to any disclaimer, the term of this patent is extended or adjusted under 35 U.S.C. 154(b) by 0 days.

(21) Appl. No.: 10/033,618

(22) Filed: Dec. 26, 2001

(65) Prior Publication Data

US 2002/0092698 A1 Jul. 18, 2002

(30) Foreign Application Priority Data

Dec. 28, 2000 (DE) .......................... 100 65 556

(51) Int. Cl.[7] ................................ B62D 13/00
(52) U.S. Cl. ....................... 180/419; 180/442
(58) Field of Search ................. 180/419, 418, 180/414, 441, 442, 408, 6.3, 235

(56) References Cited

U.S. PATENT DOCUMENTS

| | | | |
|---|---|---|---|
| 3,439,768 A | * | 4/1969 | Medley |
| 4,565,257 A | | 1/1986 | Hanson |
| 4,802,545 A | | 2/1989 | Nystuen et al. |
| 5,234,069 A | * | 8/1993 | Krone et al. ............... 180/135 |
| 5,562,175 A | * | 10/1996 | Bjorsne et al. ............ 180/419 |
| 5,899,292 A | * | 5/1999 | Paul et al. ................. 180/419 |
| 5,908,081 A | * | 6/1999 | Olson ....................... 180/419 |
| 6,039,133 A | * | 3/2000 | Zulu ........................ 180/6.64 |
| 6,345,932 B1 | * | 2/2002 | Fix ........................... 404/126 |

FOREIGN PATENT DOCUMENTS

DE              354054           6/1986

* cited by examiner

*Primary Examiner*—Avraham Lerner

(57) ABSTRACT

A steering system and a method for steering a vehicle, that has a wheel steering and an articulated steering. The steering system (1) has a steering unit (2), a first steering motor arrangement (7), which acts upon steered wheels, a second steering motor arrangement (8), which acts upon a converting kit, and a selection valve (6), which connects the steering unit (2) with either the first steering motor arrangement (7) or the second steering motor arrangement (8) in such a way that a steering will activate either the wheel steering or the articulated steering.

7 Claims, 1 Drawing Sheet

STEERING SYSTEM AND METHOD FOR STEERING A VEHICLE

FIELD OF THE INVENTION

The invention concerns a steering system, particularly for a vehicle that has a wheel steering and an articulated steering, with a steering unit, a first steering motor arrangement, a second steering motor arrangement and a selection valve, which connects the steering unit with either the first steering motor arrangement or the second steering motor arrangement. Further, the invention concerns a method for steering a vehicle, in which a steering unit activates a first or a second steering, particularly a wheel steering or an articulated steering.

BACKGROUND OF INVENTION

A conventional steering system and a method are shown in DE 35 43 054 A1. By means of the selection valve, the driver can direct the hydraulic fluid controlled by the steering unit to the first steering motor arrangement, which acts upon steered wheels, for example the front wheels of a tractor, a building site vehicle or another self-propelled working machine. After changing over the selection valve at the end of the activation of the wheel steering, the steering unit can also be connected with the second steering motor arrangement, which acts upon a converting kit. In this connection, the vehicle has two parts, which are articulately connected with each other via the converting kit. When the two vehicle parts are brought to an angle position in relation to each other by means of the converting kit, relatively small radii can be driven with the vehicle.

A similar system is shown in U.S. Pat. No. 4,565,257. In this system, the steered wheels cannot only be turned in the same direction as the articulation of the vehicle, but also in the opposite direction, so that with articulated front part the vehicle can still drive straight forward.

Finally, U.S. Pat. No. 4,802,545 shows a steering system for a vehicle with wheel steering and articulated steering.

With such vehicles, the driver selects the suited mode of steering according to what is needed. However, the need may change during the driving or even during a steering movement. The changing over from one mode of steering to another may partly cause substantial deviations in the steering behaviour. These deviations are not only unpleasant for the driver. They may also cause dangerous situations.

Therefore, the principal objects of this invention are to provide increased driving comfort and safety. These and other objects will be apparent to those skilled in the art.

SUMMARY OF THE INVENTION

The steering system of this invention has a steering unit with a variable displacement and a control device which adjusts the displacement in dependence of the connection established by a selection valve.

With vehicles of the kind known, the consumption of the first steering motor arrangement, which acts upon steered wheels, is different from that of the second steering motor arrangement, which acts upon the converting kit. Usually, the steering motor arrangement for the converting kit is larger and therefore needs more hydraulic fluid to perform the same directional change of the vehicle. The quantity of hydraulic fluid, which is supplied in connection with a movement of the steering handwheel (or another steering device), is determined by the displacement of the steering unit, usually through a measuring motor section. When a steering unit is used, in which a first rotary slide is displaced by the steering handwheel in relation to a second rotary slide, to permit the flow of hydraulic fluid, which is supplied by a pump, through the steering unit, the measuring motor unit makes the second rotary slide follow in dependence of the passing oil quantity, thus a turning of the wheels or an articulation is proportional to the angular position of the steering handwheel. When now the displacement of the steering unit is chosen in dependence of whether the wheels are steered or the vehicle is articulated, the same movements of the steering handwheel cause the same steering behaviour of the vehicle with regard to curve radii.

The steering unit has two different displacements. As only two different steering methods, namely preferably articulated steering and wheel steering, are available, it is sufficient to let the steering unit work with two different displacements. Each displacement can then be adapted to the desired application.

The steering unit has a measuring motor section with two measuring motors, a change-over valve being provided, which either deactivates a measuring motor or lets it work additionally to the other measuring motor. A steering unit of this kind, bearing the name of OSPD, is available from Dan-foss A/S, Nordborg, Denmark. It is also described in DE 195 11 501 A1. When changing over the change-over valve, the displacement of the steering unit is increased or decreased in a simple way.

A delay device is provided, which sets a delay period between an activation of the change-over valve and an activation of the selection valve. An activation of the change-over valve simultaneously with the activation of the selection valve may cause relatively large jerks in the vehicle, which are uncomfortable for the driver. When, however, a time delay is introduced between the two change-over procedures, such jerks do not occur, and the comfort is of the driver is not adversely affected. The delay period is not longer than 500 milliseconds, and usually is 200 milliseconds. Such short delay periods have no disadvantageous influences on the driving behaviour of the vehicle. However, they are sufficient to avoid the jerk or the shock that may otherwise occur in connection with the change-over. It is also advantageous to have the delay period be a function of a rotary speed of a steering handwheel. Thus, the higher the rotary speed, the longer can be the delay period be chosen. As described above, a smaller displacement can be chosen for the wheel steering than for the articulated steering. Thus, the displacement can be adapted to the two different steering forms in such a way that the same turning of the steering handwheel will always result in the driving of the same curve radii. At least when only one of the two steering forms is activated, the driver has the same steering feeling. Deviations may occur, when with an articulated vehicle also the wheels are turned. However, such a case demands a deliberate action by the driver, in connection with which he must anticipate a different steering behaviour of the vehicle. In the "normal case", when the driver selects a steering form from straight forward driving, the result will be conditions equal or at least similar to those described above.

When changing over from one steering form to the other, a delay period takes place between the change-over of the displacement and the change-over of a connection between the steering unit on the one side and the wheel steering or the articulated steering on the other side. When the change-over between the two steering forms and the change of the displacement occur at the same time, a jerk may sometimes appear, which is felt as an unpleasant shock by the driver. When, a delay period takes place, this jerk is avoided.

When changing over from the articulated steering to the wheel steering, the displacement of the steering unit is changed first, and then the connection is changed over. The jerk or shock mainly appears when changing over from the articulated steering to the wheel steering. The delay period increases the comfort of the driver.

The delay period is selected in dependence of a steering speed. The faster the vehicle is steered, that is, the higher the speed with which the directional change takes place, the longer is the delay period. On the other hand, this means that in connection with slow directional changes the delay period can be very short. The steering speed is derived from a rotary speed of a steering handwheel.

DESCRIPTION OF THE PREFERRED EMBODIMENT OF THIS INVENTION

Figure 1:
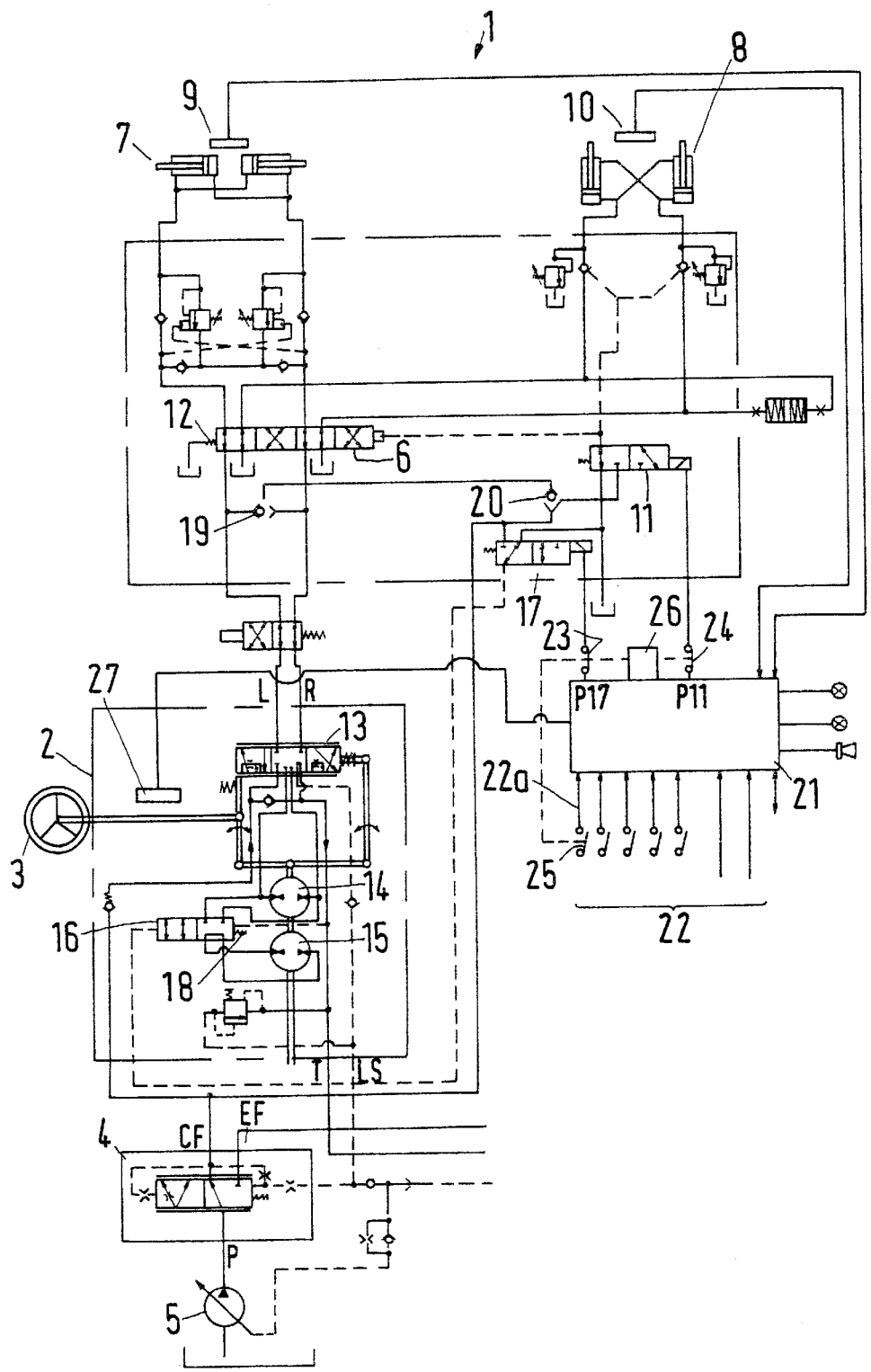
FIG. 1 is a schematic view of the steering system of this invention.

FIG. 1 shows a steering system 1 of a vehicle (not shown in detail), comprising a steering unit 2, which is activated by a steering handwheel 3. The steering unit 2 is connected with a pump 5 via a priority valve 4. The priority valve ensures that the steering unit 2 is always supplied with sufficient pump pressure.

The steering unit 2 has an outlet with two directional lines L, R, which are connected with a selection valve 6. The selection valve 6 can connect the outlet of the steering unit 2 with either a first steering motor arrangement 7 or a second steering motor arrangement 8. The first steering motor arrangement 7 acts upon wheels, not shown in detail, which can be turned in relation to a vehicle part, while the second steering motor arrangement 8 acts upon a converting kit, and can cause that two vehicle parts, which are articulately connected with each other, can move in an angle position in relation to each other. The working position of the first steering motor arrangement 7 can be determined by means of a sensor 9, while the working position of the second steering motor arrangement 8 can be determined via a second sensor 10. Conventionally, both steering motor arrangements 7, 8 can be made up by one or more hydraulic cylinders.

The selection valve 6 can be switched by means of a hydraulic pressure, which again can be controlled via a pilot valve 11. The resetting of the selection valve 6 takes place via a return spring 12.

The steering unit 2 has a directional valve 13. Connected before this valve is a measuring motor section with two measuring motors 14, 15. The first measuring motor 14 is always active during a rotation of the steering handwheel 3, that is, it is passed by the oil quantity, which is supplied by the steering motor arrangement 7 or 8, respectively. The second measuring motor 15, however, can be short-circuited, so that it is inactive, or it can be connected in parallel with the first measuring motor 14 by means of a change-over valve 16, so that it increases the displacement of the steering unit 2. The change-over valve 16 is also hydraulically activated, namely by means of a second pilot valve 17, the resetting taking place via a spring 18.

Conventionally, the measuring motor 14 can work as an auxiliary pump during failure of the pressure from the pump 5, to operate the steering motor arrangements 7 or 8, respectively, during an emergency operation.

In order to provide the inlet of the first pilot valve 11 with the pressure required for displacing the selection valve 6, a first two-way valve 19 is arranged between the two directional connections L, R of the steering unit 2. The outlet of said valve 19 is connected with the inlet of a second two-way valve 20. The other inlet of the two-way valve 20 is connected with the outlet of the priority valve 4. The outlet of the two-way valve 20 is connected with the first pilot valve 11.

The selection of the steering motor arrangement 7 or 8, respectively, takes place by means of a control device 21, which receives a selection signal via one of several inlets 22, on the basis of which it activates the two pilot valves 11, 17. Schematically, this is shown in that the control device has an outlet P17 and an outlet P11, at which switches 23, 24 are arranged. When closing the switches 23, 24, the pilot valves 11, 17 are activated, and the following pressure build-up causes a change-over of the selection valve 6 or of the change-over valve 16, respectively.

The selection of the desired steering motor arrangement 7, 8 takes place by means of a switch 25, which is connected to an inlet 22a of the control device 21. A dotted line indicates that the operation of the switch 25 also causes an operation of the switches 23, 24. However, a delay device 26 is arranged between the switch 23 and the switch 24, which causes that the switch 24 to operate a predetermined delay period after the switch 23. Accordingly, for example in connection with a change from the articulated steering, that is from the operation of the second steering motor arrangement 8 via the steering unit 2, first the displacement of the steering unit 2 is reduced. This is because the change-over valve 16 is reset to the position shown in FIG. 1. Shortly after, for example 200 milliseconds later, the selection valve 6 is reset to the position shown in FIG. 1. This prevents a jerk in the vehicle caused by the change-over.

The delay period of the delay device 26 can also be made dependent on the steering speed. The steering speed can, for example, be derived from the rotary speed of the steering handwheel. For this purpose, a steering handwheel sensor 27 is provided, which is also connected with the control device 21.

The individual switches 23 to 25 and the delay device 26 are shown on the outside of the control device 21. However, the switches 23, 24 and the delay device 26 can be integral parts of the control device 21.

The steering system of this invention can also be used, when, in stead of the articulated steering, a further wheel steering is provided. For example, the steering of the rear wheels of a vehicle takes place in addition to the steering of the front wheels. In this case, the second steering motor arrangement acts upon the additionally steered wheels.

We claim:

1. A steering system for a vehicle that has a wheel steering and an articulated steering, with a steering unit, a first steering motor arrangement, a second steering motor arrangement and a selection valve having variable operating positions, which connects the steering unit with either the first steering motor arrangement or the second steering motor arrangement, characterised in that the steering unit (2) has variable displacement means adapted to displace the steering unit with a constant pump volume, a control device (21) operatively connected to the variable displacement means to adjust the variable displacement means in response to the operating position of the selection valve.

2. A steering system according to claim 1, characterised in that the steering unit (2) has two different displacements.

3. A steering system according to claim 1, characterised in that the steering unit (2) has a measuring motor section with two measuring motors (14, 15), a change-over valve (16) operatively connecting the measuring motors to deactivate the measuring motor (15) or to allow it to work in conjunction with the other measuring motor (14).

4. A steering system according to claim 3, characterised in that a delay device (26) is associated with the control device (21) to set a delay period between an activation of the change-over valve (16) and an activation of the selection valve (6).

5. A steering system according to claim 4, characterised in that the delay period is not longer than 500 milliseconds.

6. A steering system according to claim 4, characterised in that the delay period is a function of a rotary speed of a steering handwheel (3).

7. A steering system having a steering wheel, an articulated steering, a first steering motor arrangement, and a second steering motor arrangement comprising:

a steering unit operatively connected to the steering wheel;

said steering unit having a variable displacement means and a first and second measuring motors;

a selection valve having variable operation position connecting the steering unit with either the first steering motor arrangement or the second steering motor arrangement;

a control device operatively connected to the variable displacement means and adapted to adjust the variable displacement means in response to the operating position of the selection valve;

a change-over valve operatively connecting the measuring motors and adapted to deactivate the first measuring motor;

said change-over valve also adapted to allow the first measuring motor to work in conjunction with the second measuring motor.

* * * * *